No. 676,323. Patented June 11, 1901.
H. B. KEIPER.
FORGE.
(Application filed July 2, 1900.)
(No Model.) 4 Sheets—Sheet 2.

Witnesses
Marcus L. Byng
[signature]

Inventor
Henry B. Keiper
By Julian C. Dowell
His Attorney

No. 676,323. Patented June 11, 1901.
H. B. KEIPER.
FORGE.
(Application filed July 2, 1900.)
(No Model.) 4 Sheets—Sheet 3.

Witnesses
Inventor
Henry B. Keiper
By his Attorney

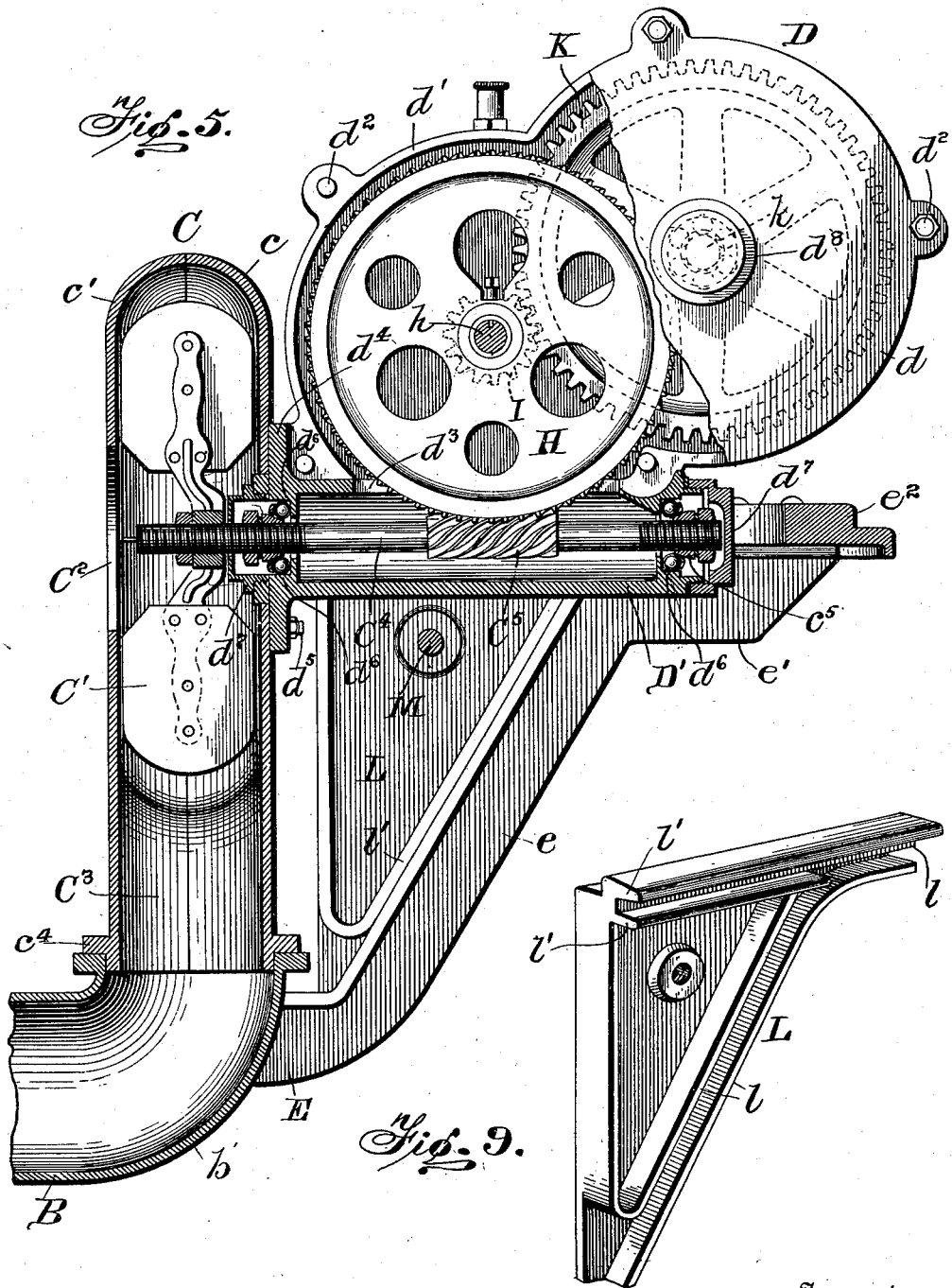

UNITED STATES PATENT OFFICE.

HENRY B. KEIPER, OF LANCASTER, PENNSYLVANIA.

FORGE.

SPECIFICATION forming part of Letters Patent No. 676,323, dated June 11, 1901.

Application filed July 2, 1900. Serial No. 22,343. (No model.)

*To all whom it may concern:*

Be it known that I, HENRY B. KEIPER, a citizen of the United States, residing at Lancaster, in the county of Lancaster and State of Pennsylvania, have invented certain new and useful Improvements in Forges; and I do hereby declare the following to be a full, clear, and exact description of the invention, such as will enable others skilled in the art to which it appertains to make and use the same.

This invention relates to improvements in forges.

The primary objects of my invention are to simplify the construction and increase the efficiency and durability of machines of this class to which my invention relates and to provide a simple and comparatively inexpensive portable forge the parts of which are adapted to be easily assembled and in compact form, so as to occupy but a small space in use and to be readily knocked down or taken apart for the renewal or repair of any injured or broken portion, and which may be light, easy running, and practically noiseless in operation.

The invention will first be hereinafter more particularly described, with reference to the accompanying drawings, which form a part of this specification, and then pointed out in the claims at the end of the description.

Figure 1:
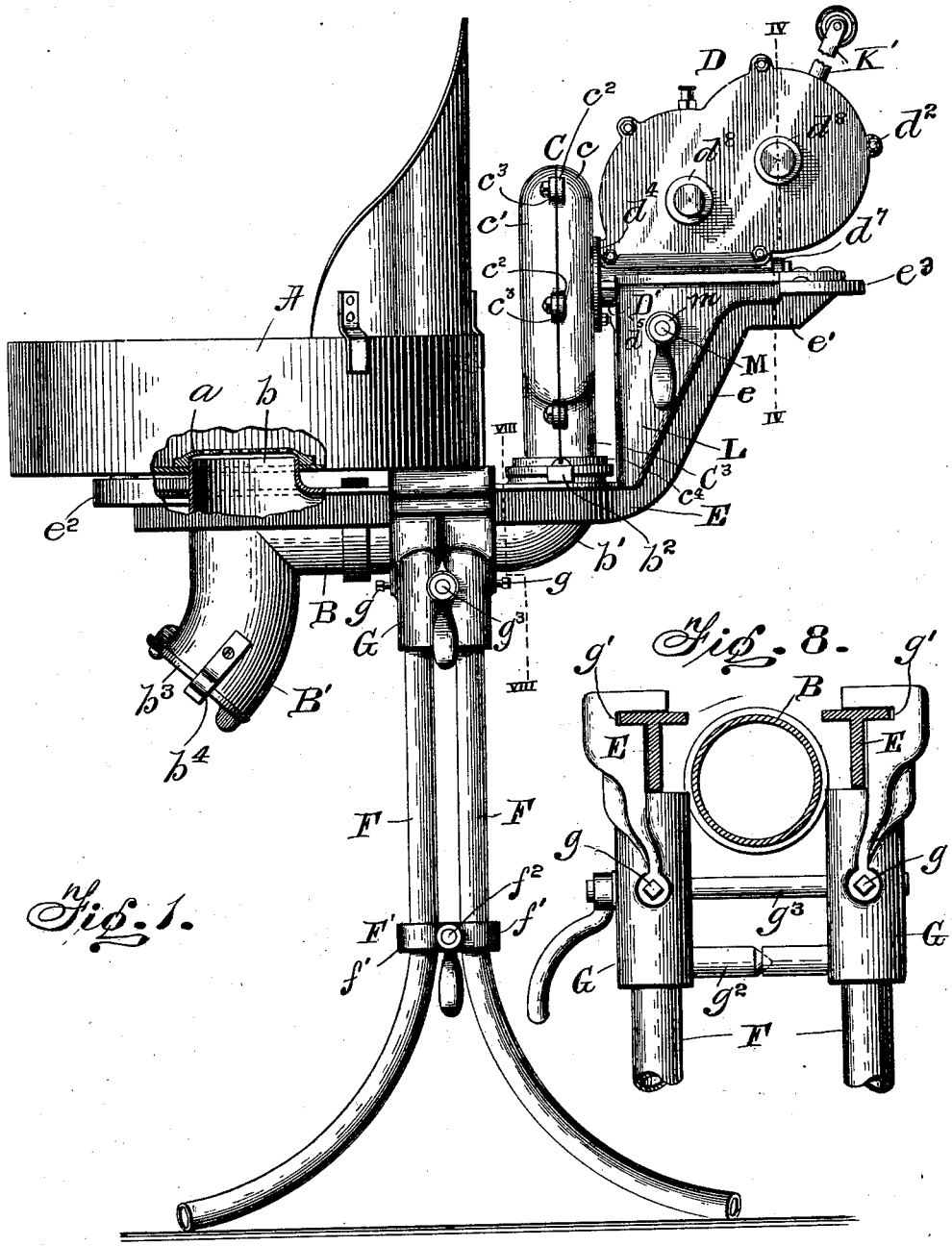
Figures 2, 6, 7:
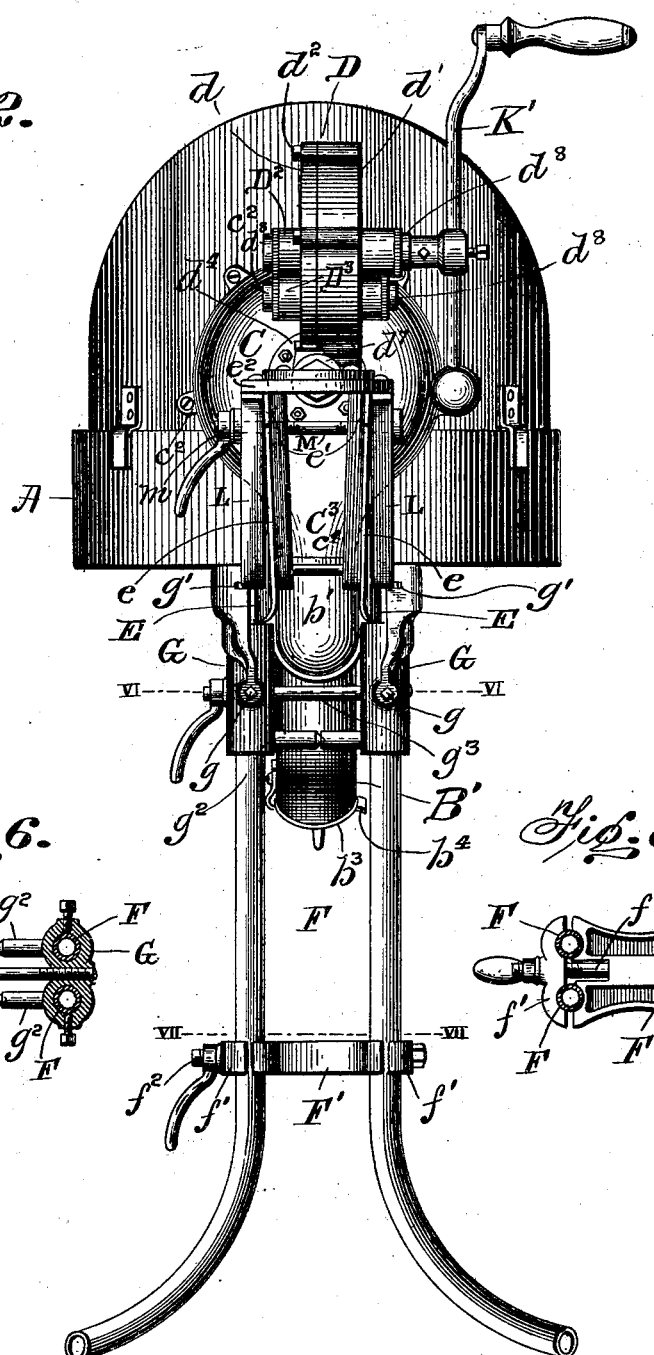
Figure 3:
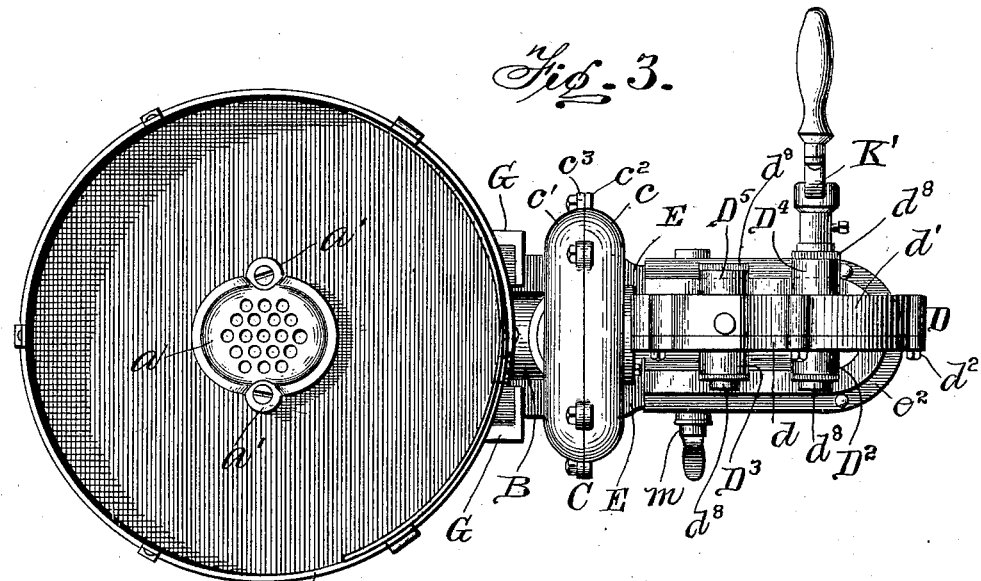
Figure 4:
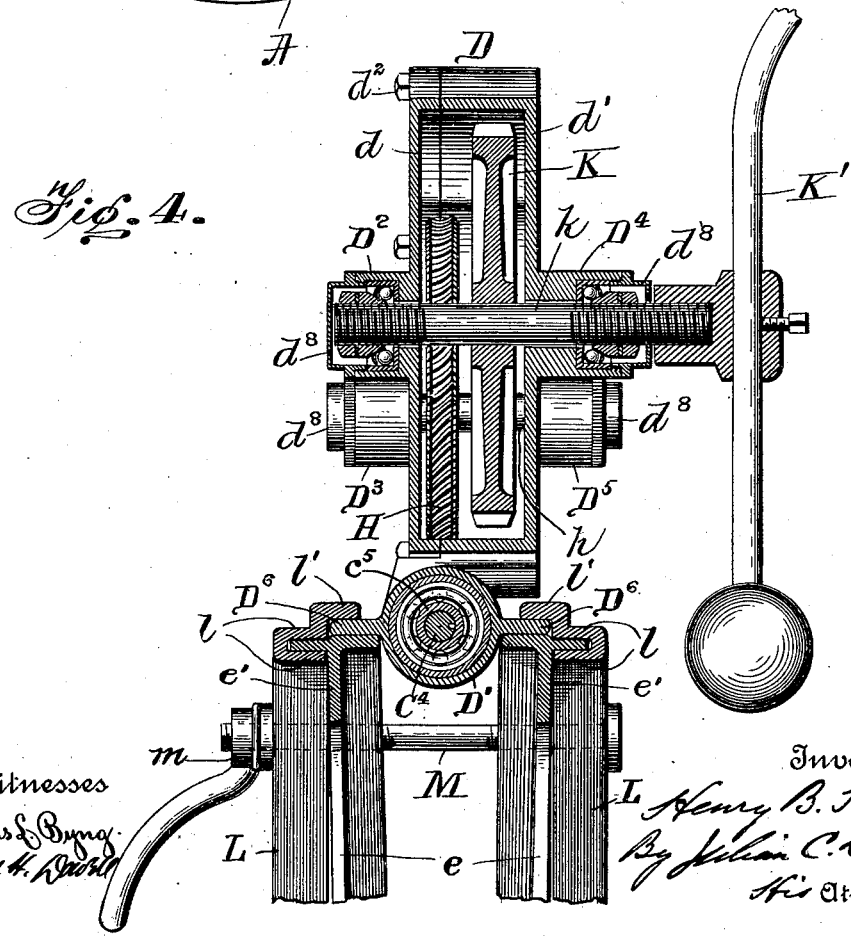

In the drawings, in which similar letters of reference are used to denote corresponding parts in the several views, Figure 1 represents, in side elevation, a portable forge embodying my invention, parts being broken away to show the connection of the twyer with the hearth or forge-pan. Fig. 2 is an end or rear elevation of the same. Fig. 3 is a plan view of the machine. Fig. 4 is a sectional elevation of the fan-driving mechanism, the section being taken on line IV IV of Fig. 1. Fig. 5 is an enlarged detail view, in front sectional elevation, of the rotary fan-blower and its driving mechanism; and Figs. 6 and 7 are detail views, being sections taken on lines VI VI and VII VII, respectively, of Fig. 2. Fig. 8 is a detail sectional view on the line VIII VIII of Fig. 1, and Fig. 9 is a perspective view of one of the clamp plates or brackets for removably securing the gear-casing to the frame and bracing the structure.

Referring to the drawings by letters of reference, the letter A denotes the hearth or forge-pan, which may be of the form shown or any suitable construction, and B the twyer or blast-pipe leading thereto from the chamber or casing C of a rotary blower or fan which is impelled by mechanism inclosed within the casing D. The said hearth, blower-casing, and connecting-twyer may be supported by a suitable frame, which preferably consists of a pair of beams or bars E E, horizontally disposed, and supporting legs or standards F F therefor, together with suitable means for bracing said beams and standards and securing the standards to the beams. The beams E E are preferably T-shaped for the purpose of securing lightness and strength, and also for the reason that the flanges thereof afford a convenient hold for attachment of the several parts of the machine, and said beams may be provided at the rear of the standards F F with upward extensions or slanting portions $e\ e$, terminating in horizontally-disposed end portions $e'\ e'$ for the purpose of supporting the driving mechanism of the rotary fan or blower in a raised position. At each end the beams E may be braced or secured together by suitable castings or plates $e^2$ and $e^3$, having apertures therein to receive fastening bolts, rivets, or screws for securing the castings to the flanges of the beams. The legs or standards F F, preferably four in number, may be formed of gas-pipe for the purpose of securing lightness and strength, the lower portions thereof being curved or bent considerably outward to afford a stable support for the machine. The upper ends of said standards may be fitted within the tubular portions of brackets or castings G G, which support the T-beams E E, two of said standards being fitted in each of said brackets and rigidly secured therein in any approved manner, as by set-screws $g\ g$. Each of the brackets or castings supports one of the beams E, the vertical or depending flanges of said beams resting on ledges or shoulders formed at the terminus of the tubular portions of the brackets, while the horizontal or cross flanges of the beams are embraced by slots or grooves $g'$ in vertical extensions of said brackets, so as to hold the beams securely and prevent rocking or turning of the same. The said beams E are of course supported on the blocks or castings G at such portion of their length as to adapt the weight of the parts of the machine on opposite sides of the standards to be properly balanced.

In order to hold the brackets or castings G G, with the standards fitted therein, in proper position and at a suitable distance apart, said brackets may be provided on their confronting faces with suitable lugs or projections $g^2\ g^2$ and a bolt $g^3$, passing through and connecting said blocks and having a fastening-nut on a threaded end thereof, whereby said brackets may be brought or clamped together, with their lugs or projections abutting each other. Preferably one of the projections of each of said brackets is provided with a pointed or tapered end which fits within a socket end of a lug or projection of the other bracket, as shown more clearly in Fig. 6, whereby said projections are prevented from slipping past each other and the blocks and the upper ends of the standards held in rigid position.

To render the standards perfectly rigid and increase the security of the frame, the standards F are preferably braced or connected at an intermediate portion of their length by any suitable means, as by the clamp device illustrated more clearly in Fig. 7, which consists of a main portion F' and end portions $f'\ f'$, with grooves formed between their confronting faces to embrace the legs or standards, opposite pairs of the standards being clamped at each end of the main portion F', between the same and one of the end pieces $f'$, by a single bolt $f^2$, uniting the three parts of the clamp and having a fastening-nut at one end.

Returning to the more essential parts of the forge, the hearth or forge-pan A is supported at one side of the standards and the blower and driving mechanism therefor at the other side, so as to properly balance the machine, the blower casing or chamber C having connection with the hearth by the twyer or blast-pipe B, which is placed between the beams E E. The said twyer or blast-pipe B may be formed or provided at its forward end with an upwardly-extending portion $b$, which passes into the floor or bottom of the hearth and has its opposite end $b'$ in communication with the blower chamber or casing C. The twyer may be supported between the beams E E by means of suitable lugs or ears $b^2\ b^2$ on the outer sides of the terminal portions $b$ and $b'$, said lugs having apertures therein to receive fastening screws or bolts to secure the same to the flanges of the beams. To prevent accumulation of fuel or waste from the forge-pan therein, the twyer is also preferably provided with a downwardly-extending elbow portion B' beneath the hearth or pan to receive any droppings therefrom, the lower opening of said elbow portion being closed by a suitable cover or plate $b^3$, which may be held normally tight against the pipe by means of a spring $b^4$ or by other suitable means to prevent the passage of the draft through said opening.

The hearth or forge-pan A is provided with an aperture in the floor or bottom thereof adapted to receive the upper end $b$ of the twyer, and said opening is covered by a perforated cap $a$. The cap $a$ may be provided with apertured lugs or ears $a'$, registering with apertures in the lugs $b^2$, to receive bolts for securing the hearth or forge-pan rigidly in place and to the flanges of the beams E. The forge-pan may also be steadied and supported in position by resting on the brackets G G and on the casting or plate $e^2$ at the front end of the beams E.

The chamber or casing C of the rotary blower or fan may consist of two parts $c$ and $c'$, fitted together and provided with external ears or lugs, as $c^2\ c^3$, having registering openings therein to receive fastening bolts or screws by which the parts are secured together. Any approved fan, paddle, or wing-wheel C' may be placed within the casing, the same being impelled by mechanism inclosed within the casing D. An inlet-aperture $C^2$, for the ingress of air to the rotary blower, is provided in one of the parts $c'$, and the outlet-nozzle $C^3$ of the casing or chamber is connected to the twyer B, the lower portion of said casing C being suitably fitted therein and supported thereon, as by means of the flange $c^4$. The blower-casing may be secured to the casing of the fan-driving mechanism at the side or part opposite to the inlet-aperture $C^2$.

The housing or casing D for the blower or fan-driving mechanism is made in two parts, $d$ and $d'$, fitted together and secured by screws or fastening-bolts, as at $d^2$. Said casing is also formed integrally with a tubular portion D', depending from the lower edge of the part $d'$ and having an opening $d^3$ therein for the engagement of the worm-wheel and worm, to be presently described. The tubular part D' may also be provided at its forward end with an external flange $d^4$, having apertures therein to receive fastening screws or bolts $d^5$, by which the housing or casing D is secured to the blower casing or chamber C.

Within the tubular portion D' of the casing is journaled the shaft $C^4$ of the rotary fan or blower, having rigidly secured thereto in any approved manner or integral therewith a worm $C^5$, with the requisite number of worm-teeth or spiral ribs of the required pitch and slope, adapted to be engaged by the worm-wheel within the casing D. The fan-shaft $C^4$ may be journaled in any suitable bearings in the tubular portion D', but preferably in ball-bearings, and for this purpose the said tubular portion D' of the gear-casing may be internally provided with oppositely-facing bearing-cups $d^6\ d^6$, and suitable bearing-cones $c^5\ c^5$ may be secured on the opposite ends of the fan-shaft and screwed or adjusted into said cups, so as to bear thereagainst through the medium of antifriction-balls contained within the cups around the shaft. The fan-shaft will of course be held rotatably in place by means of the oppositely-facing bearing-cones bearing in their respective confronting cups, and the said cones may be secured in place on the shaft by fastening-nuts or other suitable means. In order to separate the antifriction-balls in the bearings of the fan-shaft, to reduce the number of balls used, and to reduce the friction in said bearings to a minimum, as well as to facilitate placing the balls within the cups and to prevent them from falling out when the cones are removed, said balls may be held in a ball retainer and separator of any approved construction, though the retainers may be dispensed with, if desired. The fan-shaft $C^4$ passes through the forward end of the tubular part $D'$ into the blower chamber or casing C, and at its forward end, within the blower-casing, is keyed or otherwise rigidly secured to the hub of the fan, paddle, or wing-wheel $C'$. The ends of the tubular part $D'$ are left open for access to the fan-shaft bearings, and to exclude dust from said bearings and also the gear-casing D said open ends may be provided with suitable caps $d^7$ $d^7$, secured thereto, as shown, or in any suitable manner.

As shown in the drawings, the gear casing or housing D is provided with external bearing-lugs $D^2$ and $D^3$, integral with the part $d$, and external bearing-lugs $D^4$ and $D^5$, integral with the part $d'$, the bearings of the lugs $D^2$ and $D^4$ having a common axis, as also the bearings of the lugs $D^3$ and $D^5$.

In the bearings of the lugs $D^3$ and $D^5$ are journaled the spindle ends of a shaft $h$, having rigidly affixed thereto in any approved manner the central hub of a worm-wheel H, with worm-teeth on the periphery thereof engaging or intermeshing with the worm-teeth or spiral ribs which form the worm $C^5$ on the fan-shaft, while adjacent to said worm-wheel and having its central hub also rigidly affixed to said shaft in any approved manner is a pinion I, (shown in dotted lines in Fig. 5,) having the required number of teeth in its periphery and gearing or intermeshing with a spur-wheel K of the required diameter, having its hub rigidly secured to the body of a shaft $k$. One end of the shaft $k$ is journaled in the bearing-lug $D^2$ and the other end in the bearing-lug $D^4$, extending therethrough and having a lever-arm $K'$ rigidly secured to the outer end of said shaft $k$ in any approved manner, whereby motion is given to the gearing and the fan rapidly rotated.

It will be observed that the worm-wheel is arranged in the plane of the worm-shaft on which the rotary blower or fan is secured, and the gear-casing is secured to the fan casing or chamber at right angles thereto, thus bringing said fan and gearing into close proximity and housing the same in compact form.

The shafts $h$ and $k$, above mentioned, may be journaled in any suitable bearings in the lugs $D^2$ $D^4$ and $D^3$ $D^5$, respectively, though preferably in ball-bearings, and for this purpose I provide bearing-cups in said lugs and bearing-cones on said shafts, which may be screwed or adjusted into said cups, so as to bear thereagainst through the medium of antifriction-balls contained within the cups around the cones, similarly to the bearings of the fan-shaft $C^4$. The antifriction-balls in said bearings for the shafts $h$ and $k$ are also preferably held in suitable ball retainers and separators, though the retainers may be dispensed with, if desired. The outer open ends of the bearing-lugs for the shafts $h$ and $k$ may be closed by suitable caps $d^8$ $d^8$, screwed thereto to prevent the admission of dust to the bearings and into the gear-casing.

To secure and firmly support the casing D on the frame of the machine, the tubular part $D'$ of the casing is externally provided with longitudinal projections or flanges $D^6$ $D^6$ on its opposite sides, which rest on the horizontal portions $e'$ $e'$ of the beams E, (see Fig. 4,) and two clamp-plates L L, preferably of the construction shown in detail in the drawings, are fitted against the outer sides of the beams E, said plates being provided on their inner or confronting faces with parallel flanges $l$ $l$, embracing the outer flanges of said beams, and parallel flanges $l'$ $l'$, embracing the said external projections $D^6$ of the part $D'$ of the gear-casing. A bolt M, having a clamping-nut $m$ on a threaded end thereof, passes through said plates L L, whereby the plates may be drawn toward each other, clamping between them the said beams E and the tubular part $D'$ of the gear-casing, thus bracing the beams and securing and firmly supporting the gear-casing on the frame.

It will be observed that I thus provide a simple and efficient machine having its several parts arranged in compact form and rigidly secured together in such manner that the machine elements may be easily put together or taken apart or one or more parts removed without disturbing the arrangement of the other parts, while the fan-driving gearing is housed and protected within a casing which may be detached without disturbing the gearing therein or taken apart to permit the gearing to be removed or replaced. The fan-driving mechanism as constructed is easy-running and practically noiseless in operation and may be actuated with a small expenditure of power by turning the crank-handle secured to the axis of the spur-wheel meshing with the pinion on the worm-wheel, whereby a rapid rotary motion is imparted to the fan, so as to produce a powerful blast.

Having thus fully described my invention, what I claim as new, and desire to secure by Letters Patent of the United States, is—

1. In a portable forge, the combination with the hearth and blower, of a horizontally-disposed twyer leading from the blower to the hearth, a pair of horizontal beams directly supporting said hearth, blower and twyer respectively, the twyer being secured between said beams, and legs or standards secured to and supporting said beams intermediate the hearth and blower; substantially as described.

2. In a portable forge, the combination with the hearth and blower, of a horizontally-disposed blast-pipe leading from the blower to the hearth, a pair of horizontal beams directly supporting said hearth, blower and blast-pipe respectively, the said blast-pipe being secured between the beams, a bracket supporting each of said beams intermediate the hearth and blower, and standards rigidly secured to and supporting said brackets; substantially as described.

3. A portable forge comprising vertically-disposed legs or standards, a pair of horizontally-disposed flanged beams supported intermediate their ends by said standards, brackets securing said beams to said standards having recesses to receive the upper ends of said standards and grooves to embrace the flanges of the beams so as to prevent rocking of the latter, a hearth and blower supported by the angle-beams at opposite sides of the standards, and a twyer leading from said blower to the hearth and secured between said beams; substantially as described.

4. A portable forge comprising vertically-disposed standards, a pair of brackets secured to the upper portions of said standards, a pair of horizontally-disposed beams carried by said brackets, and a hearth, blower and twyer directly supported by said beams, the said hearth and blower being placed on opposite sides of the brackets and the twyer between the beams; substantially as described.

5. In a portable forge, the combination with the hearth and blower, of a horizontally-disposed blast-pipe leading from the blower to the hearth, a pair of horizontal beams supporting said hearth, blower and blast-pipe, the blast-pipe being secured between the beams, a pair of brackets supporting said beams between the hearth and blower, said brackets being provided with abutting lugs on their confronting faces to separate the same and a fastening-bolt for drawing them together, and supporting-standards rigidly secured to said brackets; substantially as described.

6. In a portable forge, the combination with the hearth and blower, of a horizontally-disposed blast-pipe leading from the blower to the hearth, a pair of horizontal beams supporting said hearth, blower and blast-pipe, the blast-pipe being secured between the beams, a pair of brackets supporting said beams intermediate the hearth and blower, and standards rigidly secured to said brackets; said brackets being provided with a means for drawing them together and with abutting lugs on their confronting faces to brace and hold them at a suitable distance apart, one of said lugs on each of said brackets having a pointed end and one a socket end and the pointed lug of each bracket fitting into the socket-lug of the other; substantially as described.

7. In a portable forge, the combination with the hearth and blower, of a horizontally-disposed twyer leading from the blower to the hearth, a pair of horizontal flanged beams supporting said hearth, blower and twyer, the latter being secured between said beams, brackets supporting said beams intermediate the blower and hearth, each bracket having a groove to embrace the flange of the beam and a tubular portion to receive the upper end of one of the supporting-standards, standards rigidly secured in said tubular portions of said brackets, and a bolt for drawing the brackets together; substantially as described.

8. In a portable forge, the combination of the horizontal frame-beams, supporting-standards therefor, brackets having tubular portions fitted to the upper ends of said standards for securing the same to the beams, each of said brackets supporting one of said beams and provided with subjacent lugs or projections abutting similar lugs on the other bracket, and a bolt for drawing said brackets together; substantially as described.

9. In combination with the flanged beams and supporting-standards, the herein-described brackets for securing said beams and standards together and holding them in rigid relative position, each of said brackets having a tubular portion to receive the upper end of one of the standards, and a vertical extension provided with a horizontally-disposed groove therein to embrace the outer flange of one of said beams; said brackets being also provided with confronting lugs or projections constructed to interlock, and a fastening-bolt for drawing the brackets together; substantially as described.

10. A portable knockdown forge consisting of a hearth, blower and horizontally-disposed twyer leading from the blower to the hearth, and a pair of horizontal supporting-beams detachably secured to said parts, the twyer being secured between the beams, and said beams being rearwardly provided with upward extensions or slanting portions having the blower-impelling mechanism mounted thereon adjacent to the blower, standards supporting said beams between the hearth and blower and brackets uniting the beams and standards, removably secured thereto; substantially as described.

11. A portable forge consisting of vertically-disposed standards having a pair of brackets with sockets therein fitting over the upper ends of the standards, horizontally-disposed angle-beams carried by said brackets, a hearth and blower-casing supported by said beams on opposite sides of said brackets, a twyer secured between said beams leading from said blower-casing to the floor of the hearth; said beams having rearward upward extensions and a gear-casing supported thereon, a worm-shaft contained within said gear-casing and a worm-wheel meshing therewith, a rotary blower secured to one end of the shaft within the blower-casing, and means without the gear-casing for rotating the worm-wheel, thereby imparting motion to the worm-shaft and the rotary blower thereon; substantially as described.

12. In a portable forge, the combination of the vertically-disposed standards, horizontally-disposed beams supported by said standards having rearward upward extensions, a hearth and blower-casing, a connecting-twyer supported on the horizontal portions of the beams, a blower within said blower-casing, mechanism for driving said blower supported on the rearward upward extensions of the beams in proximity to the blower, a casing for said blower-driving mechanism secured at one end to the blower-casing, clamp-plates fitted against the outer sides of the beams to secure the casing of the driving mechanism thereto, and means for drawing said plates toward each other and clamping the said beams and casing of the driving mechanism between said clamp-plates; substantially as described.

13. In a portable forge, the combination of the vertically-disposed standards, horizontally-disposed angle-beams supported by said standards having rearward upward extensions, a hearth, blower and connecting-twyer supported on the horizontal portions of said angle-beams, gearing for impelling said blower supported in proximity thereto on the rearward upward extensions of said angle-beams, said gearing being inclosed in a casing having external longitudinal projections, and clamp-plates fitted against the outer sides of said angle-beams to secure the gear-casing thereto, said clamp-plates being provided with parallel flanges embracing the flanges of the angle-beams and parallel flanges embracing the said projections of the gear-casing, and means for drawing said plates toward each other so as to clamp the gear-casing and angle-beams between them; substantially as described.

14. In a portable forge, the combination with the hearth, blower and twyer, of a pair of horizontally-disposed angle-beams supporting the same, standards secured to said beams, said angle-beams having rearward upwardly-extending portions, a gear-casing inclosing suitable blower-driving mechanism supported by the upward extensions of said beams, said gear-casing being externally provided with lateral projections which rest on the said raised portions of the angle-beams, clamp-plates fitted against the outer sides of said angle-beams to secure the gear-casing thereto, said clamp-plate being provided with flanges embracing the flanges of said angle-beams and with other flanges embracing the said lateral projections of said gear-casing, and means for clamping said plates against the outer sides of said beams and gear-casing; substantially as described.

15. In combination with the gear-casing having external lateral projections thereon and the flange-supporting beams, the herein-described substantially triangular clamp-plates having parallel horizontal flanges adapted to embrace the lateral projections on the gear-casing and diagonal parallel flanges adapted to embrace the flanges of the beams, and means for drawing said clamp-plates toward each other, so as to clamp the gear-casing and beams between them, and for fastening the same; substantially as described.

16. In a portable forge, the combination of the vertically-disposed standards, horizontally-disposed beams carried by said standards having rearward upwardly-extending portions, a hearth, a blower-casing and a twyer leading from the blower-casing to the hearth supported on the horizontal portions of said beams, and a gear-casing on the raised portions thereof, said blower-casing and gear-casing being detachably secured together at right angles and each constructed in two parts removably secured so as to permit access to or removal of the blower and gearing, a worm-shaft and gearing journaled in bearings in said gear-casing, and a rotary blower secured to one end of said worm-shaft within the blower-casing; substantially as described.

17. In a portable forge, the combination with the hearth and blower, of a pair of horizontally-disposed beams supporting the blower at one end and the hearth at the other, a horizontally-disposed twyer leading from the blower to the hearth and secured between said beams, and supporting-legs secured to said beams intermediate the hearth and blower; substantially as described.

18. In a portable forge, the combination with the hearth and blower, of a pair of horizontally-disposed beams supporting the blower at one end and the hearth at the other, a horizontally-disposed blast-pipe leading from the blower to the hearth and secured between said beams, a bracket supporting said beams intermediate the hearth and blower, and standards rigidly secured to and supporting said bracket; substantially as described.

In testimony whereof I affix my signature in presence of two witnesses.

HENRY B. KEIPER.

Witnesses:
J. C. DOWELL,
JOHN H. MYERS.